April 14, 1964    N. L. CULL ETAL    3,129,107
MIXTURES OF RESINS FROM OXIDIZED AROMATIC EXTRACTS AND
OXIDIZED LIQUID DIOLEFIN POLYMERS
Filed Sept. 1, 1960
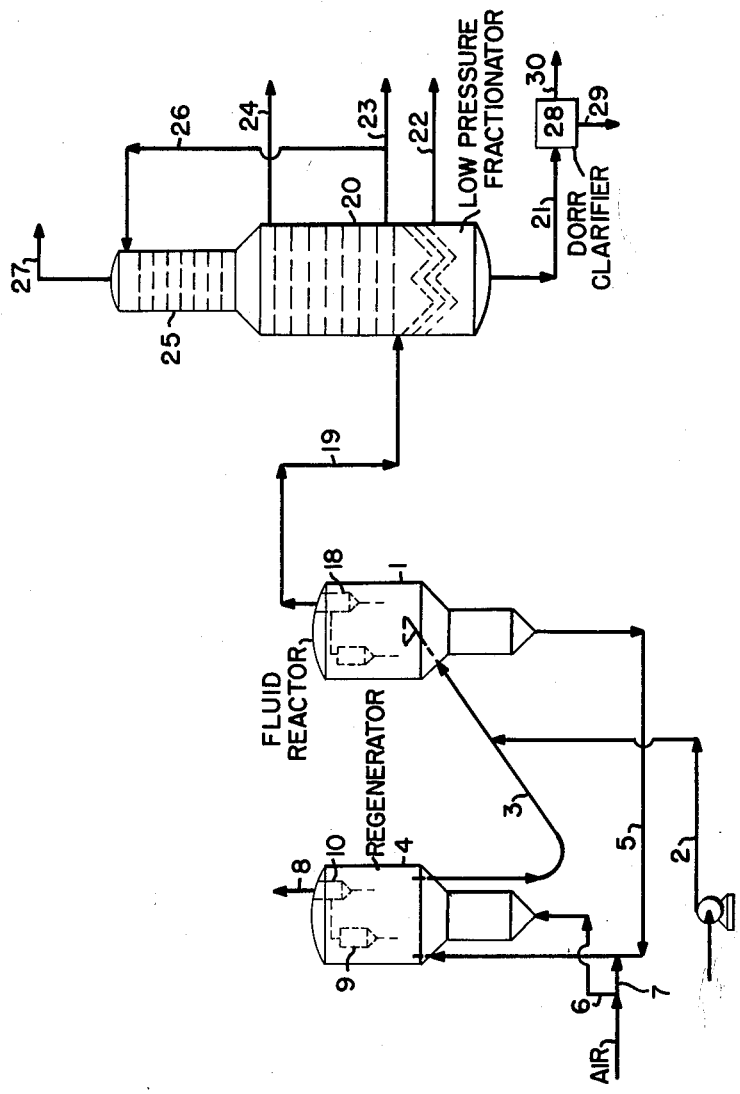
Neville Leverne Cull
Glen Porter Hamner    Inventors
By C.D. Storee
Patent Attorney United States Patent Office 3,129,107
Patented Apr. 14, 1964

3,129,107
MIXTURES OF RESINS FROM OXIDIZED ARO-
MATIC EXTRACTS AND OXIDIZED LIQUID
DIOLEFIN POLYMERS
Neville Leverne Cull, Baker, and Glen Porter Hamner,
Baton Rouge, La., assignors to Esso Research and En-
gineering Company, a corporation of Delaware
Filed Sept. 1, 1960, Ser. No. 53,504
8 Claims. (Cl. 106—285)

This invention relates to new and useful coating compositions and more specifically relates to coating compositions comprising mixtures of oxidized liquid polymer oils and the aromatic insoluble resins obtained by the oxidation of extracts of catalytic cracked fractions.

It is known to prepare coating compositions from oxidized, i.e., air-blown, liquid polymers of conjugated diolefins. However, such compositions are relatively expensive and films formed from them are relatively brittle.

Accordingly it is the main object of the present invention to provide an economical coating composition which will form films which will remain relatively flexible after curing, which possess good adhesion and have marked resistance to the action of hydrocarbon solvents.

This and other objects of the invention are accomplished by providing a coating composition comprising a mixture of oxidized liquid polymers of cyclic and acyclic diolefins of 4 to 6 carbon atoms and the resins obtained by oxidizing aromatic extracts from catalytic cracked stocks.

The oxidized diolefin polymers used in the novel coating composition of this invention are obtained by air blowing a polymer oil prepared by polymerization of conjugated diolefins of 4 to 6 carbon atoms with finely divided sodium in the presence of a hydrocarbon diluent at temperatures of 20 to 105° C. It is often desirable to copolymerize the conjugated diolefin with 5 to 50 parts by weight of a vinyl aromatic hydrocarbon, such as styrene. A particularly suitable polymer oil is prepared from 75 to 85 parts of butadiene-1,3 and 25 to 15 parts of styrene. Details for the preparation of these oils may be found in U.S. Patent 2,762,851, issued September 11, 1956, to A. H. Gleason, U.S. Patent 2,791,618, issued May 7, 1957, to J. E. Moise et al., and U.S. Patent 2,712,562, issued July 5, 1955, to R. F. Leary et al., the subject matter of each of which is incorporated herein by reference.

Polymers oils suitable for use in this invention may also be prepared by mass polymerization in the presence of a hydrocarbon soluble peroxide catalyst, such as benzoyl peroxide or cumente hydroperoxide as described in U.S. Patent 2,586,594 to Arundale.

The polymer oils obtained by the above methods are dissolved in any aliphatic or aromatic hydrocarbon solvent, or mixture thereof, boiling at temperatures 80 to 200° C. with which they are compatible and blown with air or oxygen at temperatures between room temperature and about 150° C., preferably 90 to 120° C., until 5 to 20% oxygen has been incorporated into the polymer oil. The blowing is best carried out in the presence of catalysts including the organic salts of metals, such as the naphthenates, octoates, and other hydrocarbon soluble metal salts of cobalt, lead, iron and manganese.

The aromatic resins suitable for mixing with the above oxidized oil are obtained by oxidizing or airblowing phenol extracts of heavy aromatic-containing fractions from catalytically cracked stocks or from mixtures of these with heavy virgin gas oil fractions. The oxidized product is then precipitated with aliphatic or aromatic hydrocarbons such as normal pentane, isopentane, normal hexane, petroleum ether, benzene, and the like. The amount of hydrocarbon insoluble product obtained after oxidation can be controlled by selecting the boiling range of the feed stock to oxidation. Ths feed stock should boil no lower than 750° F. and should contain a high concentration of condensed ring aromatic compounds.

For a further understanding of the invention reference may be had to the accompanying drawing in which the single figure is an elevational view in diagrammatic form showing a flow plan embodying the improvement of the present invention.

Referring specifically to the drawing, a hydrocarbon petroleum fraction boiling in the gas oil boiling range (380–1000° F.) is introduced into fluidized solids reactor 1 by means of feed line 2. Reactor 1 is filled with catalyst maintained by conventional means in pseudo-liquid state by the incoming feed vapors. The feed is introduced into the catalyst line 3 connecting regenerator 4 with reactor 1. Temperature and pressure conditions in reactor 1 are adjusted so as to secure the desired conversion of the feed oil. Spent catalyst is withdrawn from reactor 1 by means of line 5 and passed into a fluidized solids regenerator unit 4 wherein temperature and pressure conditions are adjusted to secure the desired revivification of the catalyst. Air or oxygen-containing gas is introduced into regenerator 4 by means of lines 6 and 7. Combustion gases are withdrawn overhead from regenerator 4 by means of line 8. These combustion gases as they flow upwardly in zone 4 contain finely entrained particles of catalyst which are removed by means of cyclone separator units 9 and 10 disposed in the upper area of zone 4. Cracked products are removed overhead from zone 1 by means of line 19 and introduced into distillation zone 20.

Temperature and pressure conditions are adjusted in zone 20 to remove a heavy fraction by means of line 21; a heavy gas oil fraction by means of line 22 and a light gas oil fraction by means of line 23. A fraction boiling in the motor fuel boiling range is removed by means of line 24. Gases are passed upwardly through an absorption section 25 and countercurrently contact a downflowing absorption oil which is preferably light gas oil from line 23 which is introduced into the top of the absorption sections 25 by means of line 26. Gas substantially completely free of normally liquid hydrocarbons are removed overhead from zone 25 by means of line 27 and handled as desired.

The heavy fraction is withdrawn through line 21 and passed to clarifier 28 where entrained catalyst is settled out and removed through line 29. The clarified oil is withdrawn through line 30 and represents one of the source materials for the formation of the aromatic resins used in this invention.

Another suitable source material is that obtained by mixing the clarified oil withdrawn through line 30 with a heavy mixed virgin gas oil boiling at 900–1050° F. Suitably these oils may be mixed in the ratio of 25 to 75 parts by wt. of clarified oil to 75 to 25 parts by wt. of heavy gas oil. This mixture is then extracted in known manner by means of spent phenol from the extraction of lubricating oil stocks boiling at 750–1000° F. with phenol. By spent phenol is meant the extract phase dissolved in the phenol. The extract obtained by extracting the clarified oil-gas-oil mixture with spent phenol and having a boiling range of 550 to 1050° F. is fractionated to remove all materials boiling below 750° F. The 750° F.+ fraction or any fraction thereof may also serve as a source of the aromatic resins used in this invention.

Regardless of the source of the feed stocks used in this invention, these feed stocks; e.g., the clarified oil or the heavy extract from a mixture of clarified oil and heavy virgin gas oil are oxidized by contacting them with air or oxygen at temperatures between 300 and 700° F. for one to ten hours. As a result of this oxidation an insoluble fraction is formed which is extracted with a hydrocarbon such as pentane or benzene or the like to obtain a residue, insoluble in aromatic hydrocarbons, e.g., benzene, representing a highly hydrogen deficient aromatic hydrocarbon resin. This aromatic insoluble fraction is dried, ground to a powder and mixed with the oxidized polymer oil in the proportions of 10–90 parts by wt. of the aromatic resin to 90–10 parts by wt. of the oxidized polymer oil to form the coating composition of this invention. When desired, the resulting blend may be cut back with a volatile solvent to obtain a consistency suitable for the particular method of application to be used.

The resultant blends are laid down as films on any desired surface and cured by baking, for example, for ten to thirty minutes at 125–250° C. They may also be air cured or subjected to the action of chemical curing agents, e.g., sulfur dioxide, at room or only slightly elevated temperature.

The invention can be more fully understood by applying the following illustrative examples to the discussion and disclosure herein set forth.

*Example I*

Five hundred grams of clarified oil were oxidized with air in a liter stirred reactor, the air being introduced at a rate of 32 liters per hour, at a temperature of 392° F. After six hours, 61 grams of an insoluble material settled out. This was washed with benzene in a Soxhlet extractor, dried and ground into a fine powder. A yield of 36 grams of benzene-insoluble aromatic resin was obtained. This represented a yield of about 7% by wt. based on the original charge.

*Example II*

A solution in Solvesso 100 (an aromatic hydrocarbon fraction boiling 156–177° C. having a kauri-butanol value of 98–100) of a butadiene-styrene copolymer oil made in accordance with the following recipe:

| | Parts by wt. |
|---|---|
| Butadiene | 80 |
| Styrene | 20 |
| Straight-run mineral spirits (boiling 150–200° C.) | 200 |
| Dioxane | 40 |
| Isopropanol | 0.2 |
| Sodium catalyst | 1.5 |
| Temperature, 50° C. | |

The solution was blown with air at a temperature of about 50–60° C. in the presence of about 1% manganese naphthenate until about 10% oxygen was incorporated. A second sample was blown until about 16% oxygen was incorporated.

*Example III*

Eight grams of the powder of Example 1 was finely ground and mixed with 4.0 grams of a 50% solution of the oxidized polymer of Example 2 (10% $O_2$) in Solvesso. A tin plate was coated with the above mixture and oven dried overnight (16 hrs.) at 120° C. The resultant film could be bent over a 1.8 in. mandrel without cracking, showed good adhesion to the metal even at the bend and was undamaged after immersion in Solvesso 100 for 6 hrs. As a comparison a film of 75% asphaltenes and 25% oxidized polymer oil was completely dissolved after immersing in Solvesso for five minutes.

A film from a similar blend employing twice as much oxidized polymer oil showed similar characteristics. When this film was air dried for 60 hours it also passed the ⅛ inch mandrel test, showed good adhesion and was unaffected by Solvesso 100 at room temperature after 6 hours.

*Example IV*

Two grams of the powder of Example 1 were mixed with 1.1 grams of 45% N.V.M. oxidized polymer oil of Example II (16% $O_2$) together with 2 grams of additional Solvesso. Tin plate coated with the mixture and dried overnight at 120° C. passed the ⅛ in. mandrel test and exhibited good adhesion to the metal. The film was also resistant to attack by Solvesso after six hours exposure at room temperature.

*Example V*

In order to show that the aromatic resins of this invention are not simply coke, eight grams of carbon black were mixed with 10 grams of Solvesso 100 and 4 grams of the oxidized resin of Example 1 (10% oxygen). Films of this mixture were laid down on tin plate and oven dried for four and 16 hours at 120° C. The film cured for four hours exhibited a very soft film and poor adhesion. They were flexible enough to bend over 1.8 in. mandrel but the adhesion was very poor at the bend.

The film cured for sixteen hours was very little better.

*Example VI*

2050 grams of the extract obtained by mixing 75 wt. percent clarified oil with 25 wt. percent heavy virgin gas oil (boiling at 900–1050° F.) and extracting with spent phenol were oxidized with oxygen using 0.01 wt. percent of cobalt naphthenate catalyst at 18 liters per hr. oxygen rate at 400° F. The oxidized product was precipitated with pentane using three volumes of pentane per vol. of oxidized extract. A yield of 25.3 wt. percent aromatic resin was obtained.

*Example VII*

Forty grams of the product of Example VI were mixed with 10 grams of the oxidized polymer of Example II (10% $O_2$), a film of the mixture laid down on tin plate and cured for 4 to 16 hours at 130° F. The cured films showed good flexibility (passing the ¼ in. mandrel test), good adhesion and good resistance to Varsol and jet fuels (K.B. value of 30–35). A similar product was obtained by mixing 60% of the resin of Example VI and 40% of the oxidized resin of Example II (10% oxygen). The following data were obtained:

| Example | 1 | 2 | 3 | 4 |
|---|---|---|---|---|
| Wt. percent oxidized polymer oil | 20 | 20 | 40 | 40 |
| Wt. percent oxidized extract | 80 | 80 | 60 | 60 |
| Cure hrs. at 130° F | 16 | 4 | 16 | 16 |
| Film thickness (mils) | 1.5 | 2.9 | 3.1 | 2.9 |
| Flexibility: | | | | |
| ⅛″ Mandrel | Failed | Failed | Passed | Failed |
| ¼″ Mandrel | Passed | Passed | Passed | Passed |
| ½″ Mandrel | Passed | Passed | Passed | Passed |
| Tackiness | None | None | None | None |

The nature of the present invention having been thus fully set forth and illustrated and specific examples of the same given, what is claimed as new and unique and desired to be secured by Letters Patent is:

1. A coating composition consisting essentially of from 10 to 90% by wt. of air-blown phenol extracts of heavy aromatic-containing fractions from catalytic cracked gas oil and 90 to 10% by wt. of an air-blown polymer of a conjugated diolefin of 4 to 6 carbon atoms.

2. A coating composition consisting essentially of 75% by wt. of air-blown phenol extracts of heavy aromatic-containing fractions from catalytic cracked gas oil and 25% by wt. of an oxidized polymer of butadiene containing from 10 to 16 wt. percent oxygen.

3. A coating composition consisting essentially of from 10 to 90% by wt. of an air-blown polymer of a conjugated diolefin of 4 to 6 carbon atoms and 90 to 10% by wt. of the resins obtained by contacting clarified oil from a catalytic cracking operation with spent phenol from the extraction with phenol lubricating oil stocks boiling 750 to 1000° F., separating the resulting mixture into an extract phase and a raffinate phase, oxidizing the extract phase at temperatures between 300 to 700° F. for 1 to 10 hrs., and precipitating the resin.

4. A coating composition consisting essentially of from 10 to 90% by wt. of an air-blown polymer of a conjugated diolefin of 4 to 6 carbon atoms and 90 to 10% by wt. of the resins obtained by contacting a mixture of 25 to 75% by wt. of clarified oil from a catalytic cracking operation and a heavy origin gas oil boiling 900 to 1050° F. with spent phenol from the extraction with phenol of lubricating oil stocks boiling 750 to 1000° F., separating the resulting mixture with an extract phase and a raffinate phase, oxidizing the extract phase at temperatures between 300 and 700° F. for 1 to 10 hrs., and precipitating the resin.

5. Composition according to claim 3 in which the oxidized polymer is an oxidized polymer of butadiene containing 10 to 16 wt. percent oxygen and is present to the extent of 25 wt. percent.

6. Composition according to claim 5 in which the oxidized polymer is an oxidized copolymer of 80% by wt. of butadiene-1,3 and 20% by wt. of styrene.

7. Composition according to claim 4 in which the oxidized polymer is an oxidized polymer of butadiene containing 10 to 16 wt. percent oxygen and is present to the extent of 25 wt. percent.

8. Composition according to claim 7 in which the oxidized polymer is an oxidized copolymer of 80% by wt. of butadiene-1,3 and 20% by wt. of styrene.

References Cited in the file of this patent

UNITED STATES PATENTS

| | | |
|---|---|---|
| 2,858,231 | Watson | Oct. 28, 1958 |
| 2,895,979 | Segraves et al. | July 21, 1959 |
| 2,927,032 | Lottermoser | Mar. 1, 1960 |
| 2,991,241 | Renner | July 4, 1961 |

FOREIGN PATENTS

| | | |
|---|---|---|
| 885,886 | France | Sept. 28, 1943 |